United States Patent [19]

Spianti

[11] Patent Number: 4,976,387
[45] Date of Patent: Dec. 11, 1990

[54] BODY-MOUNTED SUPPORT

[75] Inventor: Dany Spianti, Chartres, France

[73] Assignee: Sachtler AG Kommunikationstechnik, Garching, Fed. Rep. of Germany

[21] Appl. No.: 274,936

[22] PCT Filed: Mar. 3, 1988

[86] PCT No.: PCT/EP88/00163
§ 371 Date: Jan. 19, 1989
§ 102(e) Date: Jan. 19, 1989

[87] PCT Pub. No.: WO88/06695
PCT Pub. Date: Sep. 7, 1988

[30] Foreign Application Priority Data
Mar. 3, 1987 [FR] France ............... 87 02859

[51] Int. Cl.⁵ ............... A45F 3/08
[52] U.S. Cl. ............... 224/262; 224/211; 224/908; 354/82; 354/293; 352/243
[58] Field of Search ............... 224/908, 261, 262, 263, 224/259, 210, 211, 212; 352/243; 354/82, 293

[56] References Cited

U.S. PATENT DOCUMENTS

| | | | |
|---|---|---|---|
| 3,332,593 | 7/1967 | Fauser | 224/5 |
| 4,017,168 | 4/1977 | Brown | 352/243 |
| 4,037,763 | 7/1977 | Turchen | 352/243 |
| 4,206,983 | 6/1980 | Nettman et al. | 352/243 |
| 4,298,149 | 11/1981 | Gottschalk et al. | 224/201 |
| 4,394,075 | 7/1983 | Brown et al. | 352/243 |
| 4,474,439 | 10/1984 | Brown | 352/243 |

FOREIGN PATENT DOCUMENTS 441148 2/1927 Fed. Rep. of Germany .
2021800 12/1979 United Kingdom .

Primary Examiner—Linda J. Sholl
Attorney, Agent, or Firm—Laurence R. Brown

[57] ABSTRACT

Camera support device, worn on the body, provided with a supporting framework and equilibrated movable arms. The support framework has a rigid shell, composed of two half-shells (4,5), which rest on the stomach region and lumbar region of the user (2). Pivoting attachment device (14,15) are disposed symmetrically at each side, on the ends of two half-frames (18,19), and are joined in such a way that they remain constantly parallel. Both half-frames (18,19) are provided with a hinged part (21), rigidly attached to the camera (3). Equilibrium springs (26) between the half-frames (18,19) and the shell (4,5) balance the weight of the camera (3).

9 Claims, 5 Drawing Sheets

BODY-MOUNTED SUPPORT

The invention relates to a wearable mounting, in particular a jolt-protected body-mounted support, for recording with a film or video camera.

For recording with a mobile camera it is usual to place it on a carriage which moves along a predetermined path, whether this be on rails or a track laid down for this purpose.

Another technique, which avoids the laying down of such a path, comprises the use of a mounting to be worn by the cameraman. In this arrangement, there is still the difficulty to be overcome of holding the camera steady irrespective of the undesirable movements of the body; numerous arrangements have been proposed for this purposes. U.S. Pat. No. 4,394,075 (as well as U.S. Pat. No. 4,474,439) discloses an arrangement having an arm which is attached in articulated fashion on a support framework and is adapted to the upper part of the human body. This arrangement also has numerous disadvantages which are of both mechanical and ergonomic nature.

The damping for each of the two half-arms which form this arrangement requires the mounting in series of three tension springs, which are connected to one another by a cable, as well as of two pulleys for accommodating a sufficient number of windings in the interior of the first half-arm in order thereby to enable the arrangement comprising the three springs to behave like a single spring which is aligned along the diagonals of the deformable parallelogram which each of the two half-arms forms.

The large number of connections comprising springs/cables/pulleys makes the arrangement fault-prone, making the use of a second back-up cable necessary; for if the arrangement comes apart due to the separation of the connections, the cable can injure the cameraman. This arrangement furthermore requires a duplication of all the parts for the two articulated half-arms, thereby increasing the weight of the arrangement.

It is furthermore not possible to adapt this known arrangement to the weight of different cameras or to different modes of operation using different additional parts without altering the properties of the damping springs (in particular the spring tension), this having the consequence that a single spring is insufficient for a given weight; a change in weight has the effect that sufficient damping is no longer present along the entire path travelled by the holding arm.

As seen from the front, the attachment point for the damping arm is a long way to the side with respect to a center line through the body. This point generates a moment of force by the swivelling of the support framework, which does not rest fixedly at the sides of the cameraman. This embodiment of the support framework has the effect that the chest strap absorbs the majority of the force and compresses the sides severely.

As seen from the side, the attachment of the arm is very far forward. The distance of the attachment point from the plane in which the spinal column lies, at lumbar level, considerably increases the moment originating from the various forces applied there. This means that the lumbar region must absorb a major part of the forces which result from the moments, by reason of the camera weight and of the accessories (video monitor . . . ), with respect to the spinal column and from the forces which act on the narrow side of the parallelogram, exerted by the tension springs at the level of the arm attachment.

The chest strap of the support framework limits the breathing movements and hinders the free movements of the shoulder strap and consequently the mobility of the upper limbs which are supposed to execute the camera movements with as little vibration as possible. The location of the attachment of the arm furthermore impairs the shoulder straps with regard to the absorption of the forces resulting from the weight of the arm and of the camera. The spinal column as a whole is thereby subjected to worse loads.

Another arrangement which likewise has numerous disadvantages is known from U.S. Pat. No. 4,206,983.

In mechanical respects, this arrangement requires the use of numerous different components (springs, cables, pulleys); the large number of such connections complicates the structure and makes the arrangement fault-prone. Despite the complicated arrangement, no effective adaptation is possible in order to compensate the weight of different cameras and different equipment. The arrangement for counterbalancing the weight of the camera, which is arranged behind the cardan-type holding hoop, does not permit any variation of the moment of inertia of the individual components in order thereby to achieve good results in recording high speed.

In terms of ergonomics too, there are numerous disadvantages to be found.

The structure is asymmetric and not suited to the body. The placing of the arrangement on the body of the cameraman is extremely difficult without help. The range of operation is limited to the forward position of the camera, with the result that a free choice of position is not possible.

The rearward arrangement of the swivelling axis for the articulated arm above the shoulder has the effect that the sum of the loads (weight of the camera and of the components plus the restoring tension of the springs) is present perpendicularly behind the spinal column. This embodiment necessitates the stomach strap and the shoulder straps absorbing the whole of these forces, thereby increasing the pressure loads.

The great height of the arrangement (from the belt to the swivelling axis of the arm) causes all movements of the spinal column (bending movements to the front and to the side) to be amplified. Furthermore, this embodiment has the effect that the greatest rigidity is in the uppermost region, this proving to be a stress factor, disturbing factor and a restriction of free movements. The fastenings (stomach strap and shoulder straps) too are of little effect as regards lateral stability. The arrangement of the camera and of the additional components limits their ability to swivel freely.

Finally, the arrangement of the viewfinder (monitor) means that, in the event of relatively large swivelling movements of the camera, its tilt must be constantly readjusted since the viewfinder or monitor is not independent of the camera position.

It is the object of the present invention to create a body-mounted support, in particular for cameras, in which the abovementioned disadvantages are avoided and which, in particular, has a simple construction which is not prone to faults and is embodied in a manner suited to the body.

The body-mounted support according to the invention has a support framework to be worn by a cameraman as well as mobile equilibrated arms for holding the object to be carried. According to the invention, the support framework has a rigid, essentially annular shell which comprises two half-shells, a front lower half-shell and a rear upper half-shell, which are situated at different levels and are supported on the lower body or the rear lumbar region of the cameraman, swivellable attachment arrangements being provided symmetrically on both sides of the shell for two front half-frames which are connected together in such a way that they are at all times mutually parallel and which have an articulated connecting part to which the camera is connected via articulated parts, while resilient equilibrating parts are provided between the half-frame and the shell in order substantially to equilibrate the weight of the camera.

The shell is anatomically shaped, while the swivellable attachment arrangements are advantageously arranged essentially in the vertical plane in which the spinal column of the cameraman lies, being aligned essentially perpendicular to a mounting which is rigidly connected to a hoop which in turn is connected to the front half-shell.

The ends of each half-frame are advantageously guided in sliding and adjustable fashion in sleeves which can be swivelled by means of the swivellable attachment arrangements.

The equilibrating arrangement advantageously has at least one tension spring which stresses at least one half-frame upward and to the rear at an angle of about 45°.

The articulated connecting part advantageously has a vertical supporting part which is connected in articulated and sliding fashion to the two half-frames, as well as a device which blocks the sliding and cooperates with the joint of the half-frames.

The articulated connecting part advantageously has a supporting part, which is connected to the half-frame and on which an arm is articulated which is articulated by means of parallel articulation spindles and at whose end an arrangement is attached for the articulated mounting of a camera. A video monitor is preferably arranged on the articulated arm.

The holding arrangement for the camera advantageously has a support tube, on one end of which the mounting for the camera is provided and on the other end of which equilibrating parts are provided whose position can be adjusted radially and at an angle in a radial plane.

Further characteristics and advantages of the invention emerge from the following description of a preferred exemplary embodiment in conjunction with the drawing, in which.

Figure 1:
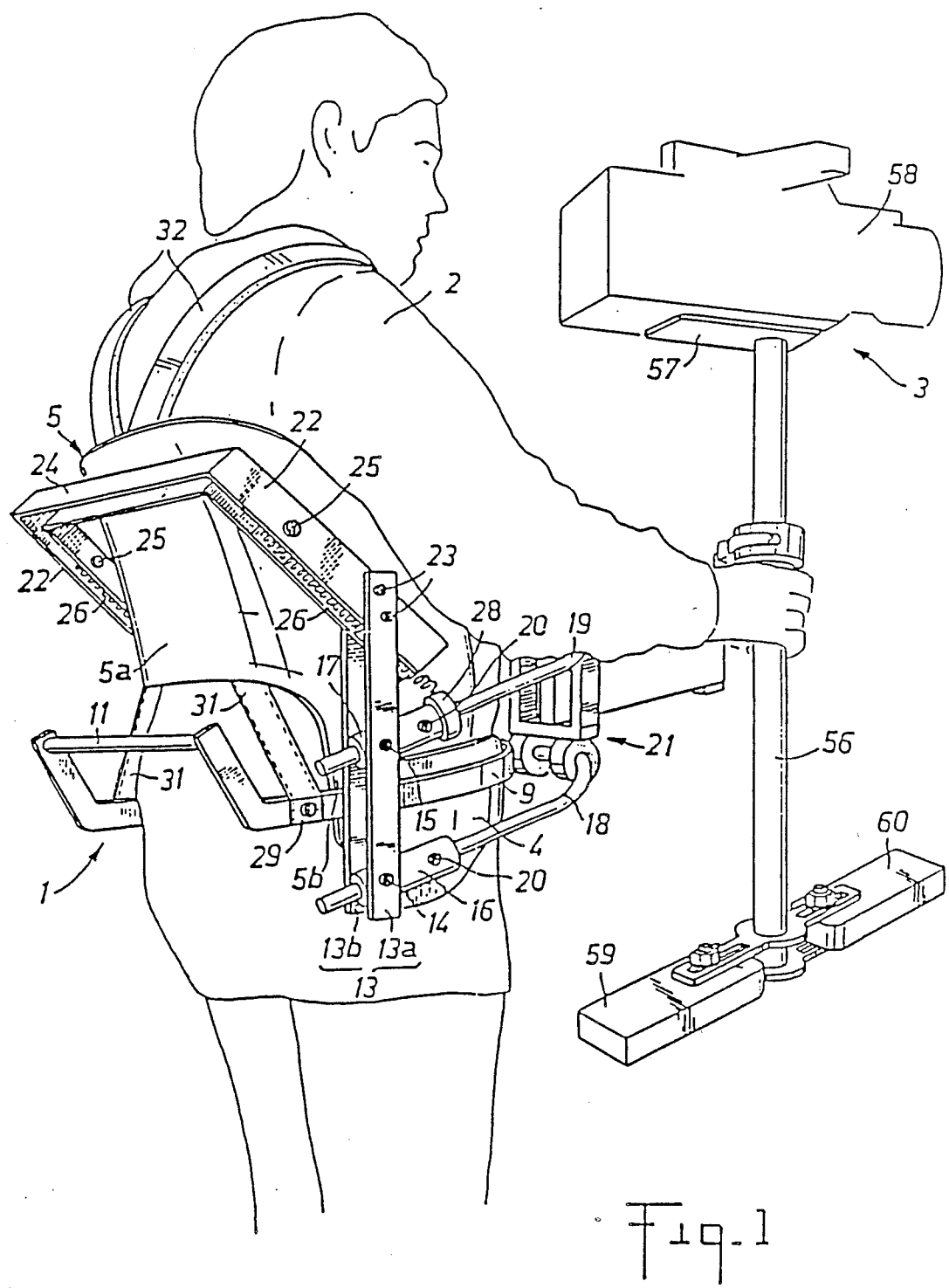
FIG. 1 shows a schematic, laterally offset rear view of the body-mounted support worn by a cameraman.

FIG. 1 illustrates a body-mounted support 1 according to the invention, which is worn by a cameraman 2 and supports a camera 3. The support 1 has an annular rigid or semi-rigid shell which comprises two half-shells 4 and 5: the front lower half-shell 4 is supported on the stomach region of the cameraman while the rear higher half-shell 5 forms a kind of back support and is supported on the rear lumbar region of the cameraman. The half-shells 4 and 5 are anatomically shaped in such a way that they are adapted to the front and rear part of the body and surround the latter.

It is possible to combine the two half-shells 4 and 5 to form a single part but it is advantageous if they comprise two separable individual parts which can be joined together in different configurations in order to take account of the build of the cameraman. For this purpose, half-shell 5 essentially has a rounded back section 5a between two lateral sections 5b which extend downward. The lateral sections 5b are partially covered by the lateral ends of the front half-shell 4. A multiplicity of openings 6 is provided in the possible overlap region of the sections 5b in order to cooperate with at least one rapid fastener (bolt 7 in FIG. 2) such that the latter passes through a corresponding opening in the lateral ends of the front half-shell 4. The front half-shell 4 is furthermore provided with slanted portions or recesses 8 on its lower regions in order to permit free movement of the thighs.

Figure 2:
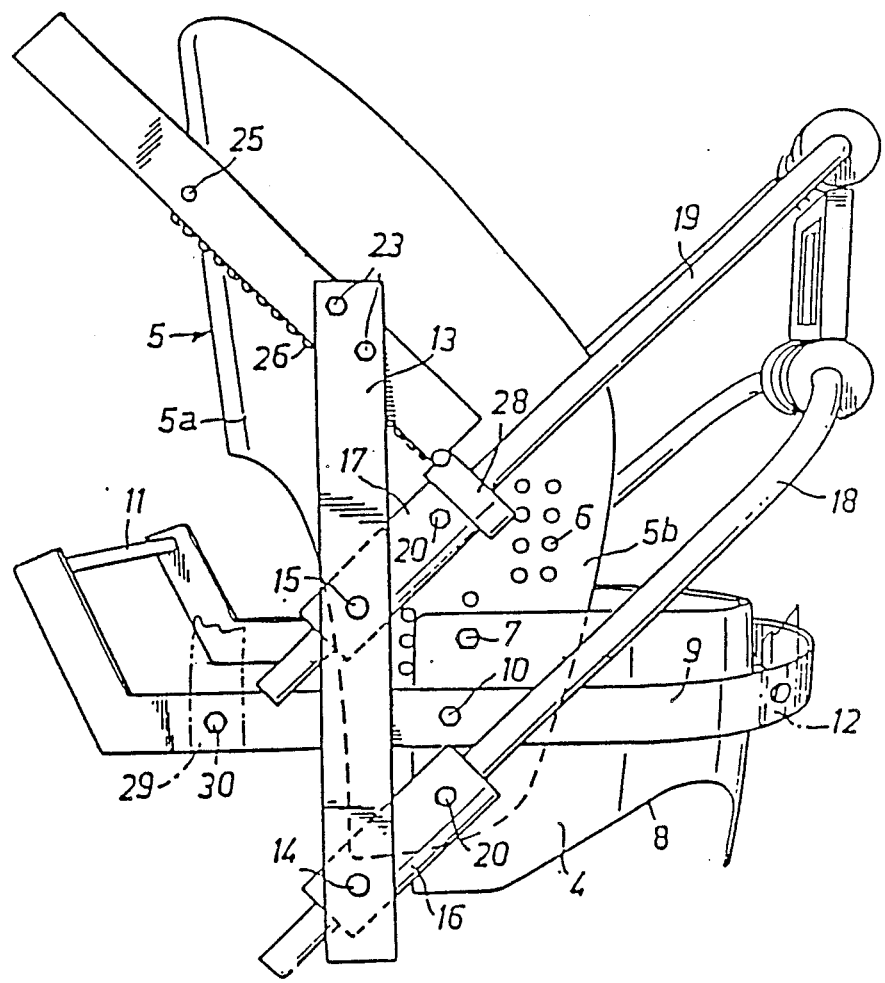
FIG. 2 shows an enlarged partial view of part of the support framework and of the equilibrating arms.

A flat hoop 9 is attached to the front half-shell 4 by means of three bolts 10, of which only one is visible in FIG. 2, the hoop being matched essentially to the shape of the half-shell 4; its ends are extended towards the rear and connected together by a rod 11. The hoop can have a plurality of openings which form different attachment locations. Although it is matched essentially to the general shape of the half-shell 4, it can be arranged at a slight interval to it between two lateral attachment points in order thereby to form a front attachment loop for the two belt parts.

Two retaining plates 13a and 13b, which are aligned mutually parallel and essentially vertical and are attached to the hoop 9 via a screw connection (not shown), are attached to the lateral sections of the hoop 9 on each side of the body. The plates, which are designated overall by 13, extend essentially perpendicular to the lateral arms of the hoop 9.

On both sides of their attachment to the hoop, the plates 13a and 13b accommodate two spindles 14, 15 on which sleeves 16, 17 are swivellably arranged in which the straight extensions of the two half-frames or hoops 18, 19 of tubing engage in sliding fashion. A screw 20 enables the hoops 18, 19 to be held fast in the sleeves 15, 16.

The hoops 18 and 19 are connected to one another at the front by an articulated connecting part 21 (which is rigidly connected to the device 3). The height of part 21 is equal to the distance separating the spindles 14 and 15, such that the hoops are mutually parallel in all positions which they can assume by reason of the swivelling movement of the sleeves 16, 17, to be precise in lateral vertical planes.

Figure 3:
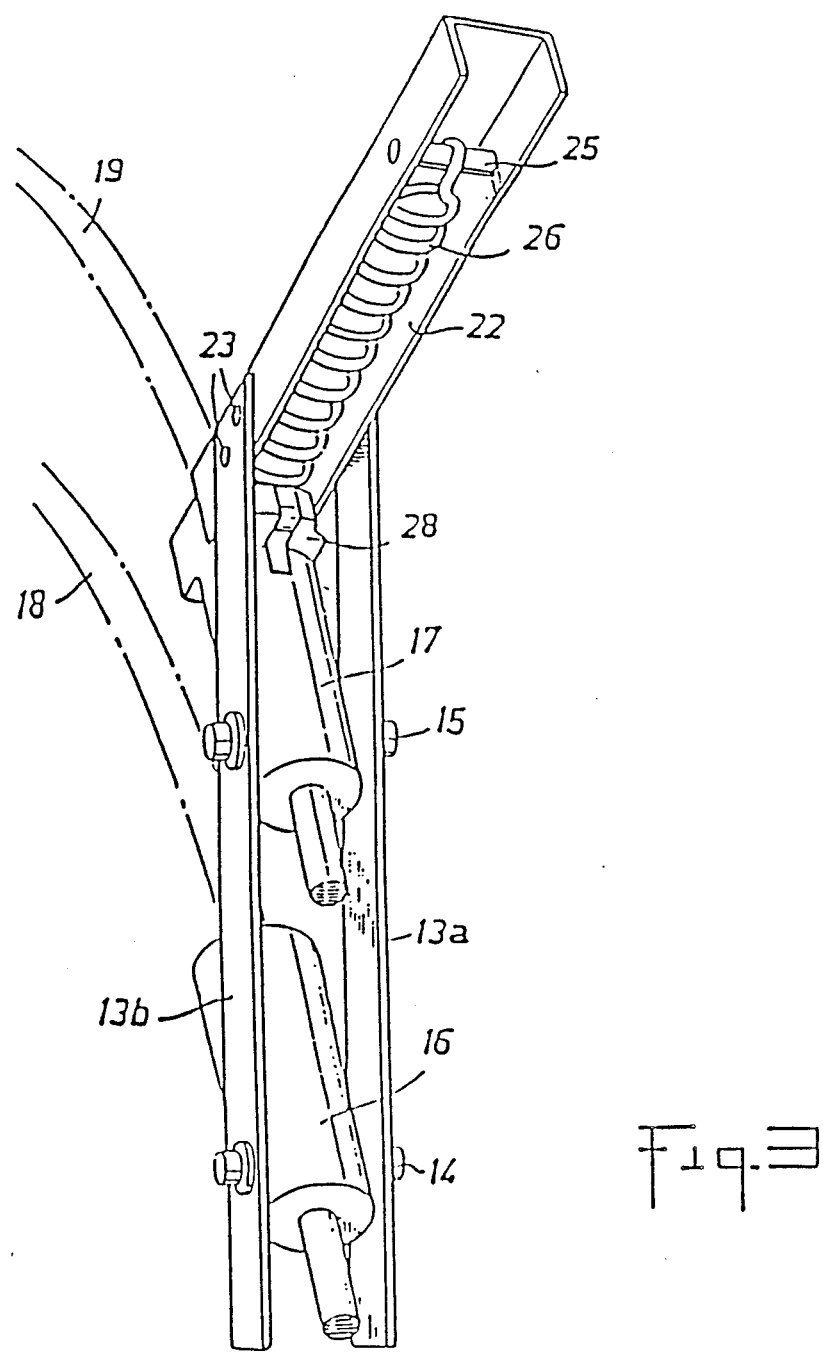
FIG. 3 shows a rear view of an individual part of the equilibrating arrangement.

At their ends, the plates 13a and 13b (see also FIG. 3) clamp two U-shaped profiles 22 which are attached by means of bolts 23 and are connected to one another by a bar 24. The profiles 22 are inclined essentially at 45° with respect to the vertical plates 13a and 13b. Between the two legs of each profile 22 there is arranged a spindle 25 to which one end of a helical tension spring 26 is attached, the other end of which is anchored at a spindle 27 which is provided in a part 28 which is rigidly connected to the forward part of the sleeve 17. Accordingly, the springs 26 continuously stress the articulated hoops 18, 19 upward towards an upper stop position which is formed by the lower end of the profile 22 and corresponds essentially to an upward slope of the hoop of 45°.

Behind the lateral extensions of the flat hoop 9 there are provided rearward attachment loops 29, which are attached by means of bolts 30, for the adjustable straps 31, the other end of which is attached at 12.

The straps 31 cross over at the back and then extend between the support of the half-shell 5 and the back of the cameraman over the shoulders of the latter, being provided in this region with extended cushions 32, before they extend downward essentially parallel to one another to the attachment location 12.

In addition or instead of the straps 31 it is also possible for a lumbar strap to be provided which can be fitted at the level of the sides of the front half-shell 4, passes through the latter and then fits round it, e.g. in the form of an attachment loop with a touch and close fastener.

In the arrangement according to the invention, the tension springs are easy to replace because only the two spindles 25 and 27 have to be released. Instead of fastening the springs on the sleeve of the upper hoop 19, it is also possible for them to be fastened on the lower hoop or on both. The inclination of the springs can also assume a value other than 45°, between 45° and 90° with respect to the horizontal, although the former is particularly advantageous, it being essential for the spring to be arranged such that it exerts a relatively constant moment on the hoop during the entire swivelling path. Instead of tension springs, it is also possible for compression springs to be used, in which case they are to be attached in a suitable position relative to the hoops 18, 19.

The invention also enables the engagement of the hoops 18, 19 in the associated sleeve to be altered by adjusting the screws 20 and hence the length of the lever arm to be adjusted.

The symmetrical configuration of the arrangement is advantageous both for the ease of handling and for the ergonomics. The swivelling axes of the sleeves are situated essentially in the plane located far back in which the spinal column lies; otherwise, considerable loads could arise for the spinal column as a result of the forces which occur.

By reason of the rigidity of the shell and of the arrangement of the individual components, in particular of the flat hoop 9, the weight of the camera exerts on the overall arrangement a moment which is equilibrated by a moment of the body of the cameraman on the shell, with a self-reinforcing clamping action: the front half-shell 4 exerts a pressure on the stomach region, while the anatomically shaped rear support surface exerts a forward- and upward-acting force on the rear lumbar region, the total friction equilibrating the vertical component of the weight of the overall arrangement, with the result that this type of clamping action greatly reduces the pressure of the shoulder straps and makes these, in theory, superfluous. The anatomical shaping of the rearward half-shell 5 with its lateral supports furthermore makes it possible to control all lateral swivel loads during a displacement of the camera from one side to the other. This stability has not the least influence on the chest movements of the cameraman and thus avoids chest straps restricting him in his freedom of movement.

Figure 4:
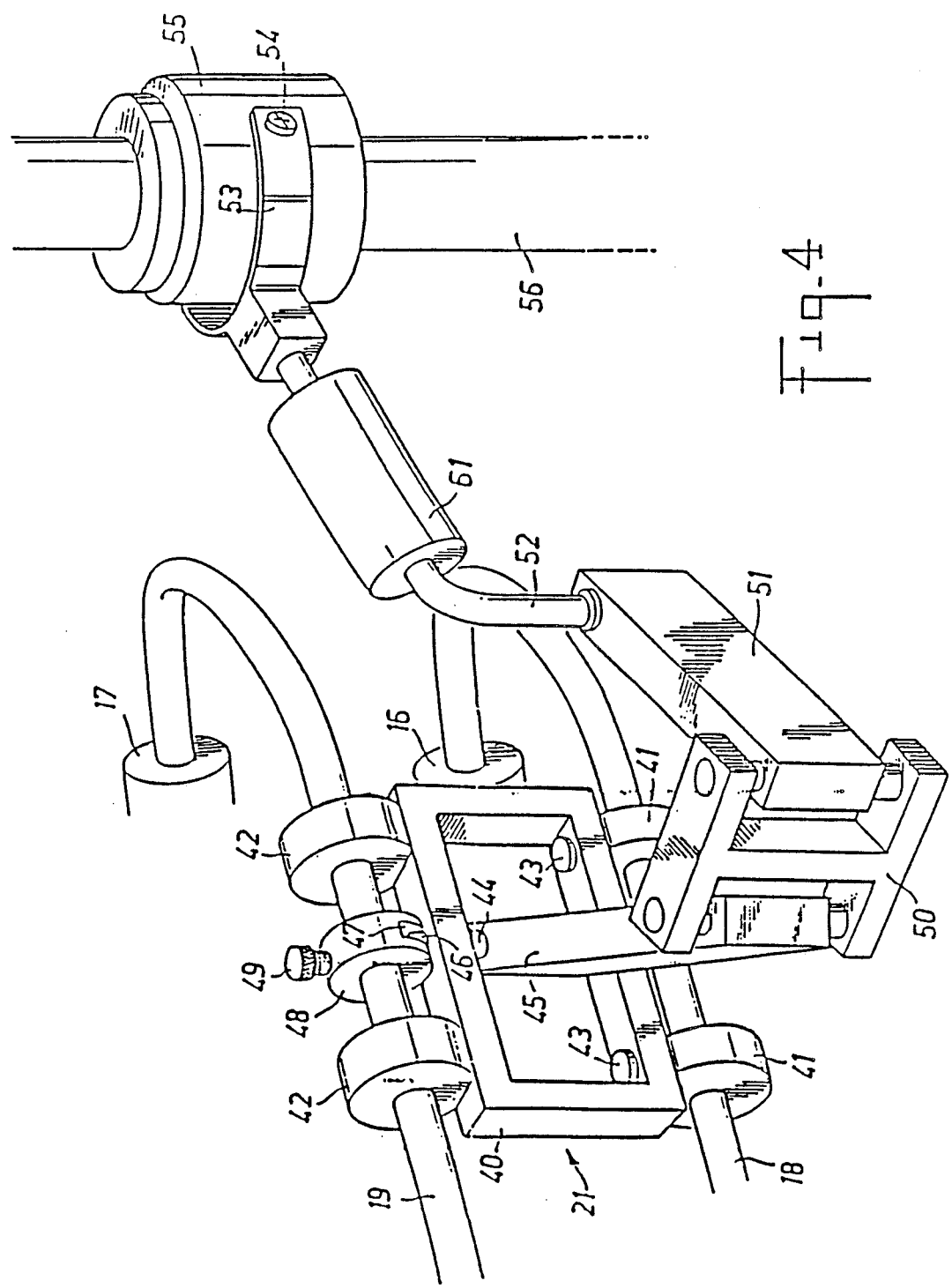
FIG. 4 shows a partially offset front view of the connecting arrangement of the half-frames.

In FIG. 4, it can be seen that the connecting part 21 comprises a rectangular frame 40, to the horizontal longitudinal sides of which two lower articulation rings 41 and two upper articulation rings 42 are attached by means of bolts so as to be perpendicular and parallel to one another. The rings 41, 42 have an inner diameter which is slightly greater than the outside diameter of the hoops 18 and 19, enabling these to slide and turn freely in the rings 41 and 42. SInce hoops 18, 19 are curved, the surface of contact with the rings 41, 42 is limited and hence the frictions reduced. The simple rings 41, 42 can also be replaced by ball bearings; a swivel bearing 44 is provided perpendicularly in the center of the frame 40 so that it serves as a swivelling axis for a forward-extending plate 45, the swivel bearing 44 or its extension 46 extending upward out of the frame 40 through an opening in the upper side of the latter and engaging with slight play in a recess which extends over at least a part of a blocking ring 48 which is provided on the hoop 19 between the rings 42. The ring 48 can be immobilized by a binding screw 49 which blocks the swivel bearing 46 in the lateral direction and hence the arrangement 21 as a whole. By reason of the groove 47 extending in the circumferential direction, the swivelling movement of the hoops 18, 19 is in no way limited by the connecting part 21.

While one end of the plate 45 swivels about the swivel bearing 44, the other end is provided with a spindle on which an H-shaped connecting part 50 is articulated, on which a second plate 51 is articulated so as to be horizontally swivellable. The vertical section of a spindle 52 is swivel-mounted at the far end of this plate 51, the other end of which spindle is bent at an angle and ends in a connecting piece which has a swivellable fork 53. A hand-grip 61 is provided between the bent part of the spindle and the fork 53. The fork surrounds a sleeve 55 which is mounted swivellably about a horizontal axis 54 and accommodates a camera holding tube 56 with rotation and sliding, as illustrated, for example, in U.S. Pat. No. 4,474,439. The fork 53 which is arranged swivellably at the end of the spindle 52, forms a universal joint.

A retaining plate 57 on which the camera 58 (FIG. 1) is secured is provided at the upper end of the holding tube 56, while at the lower end weights 59, 60 are provided in order to equilibrate the camera.

Figure 5:
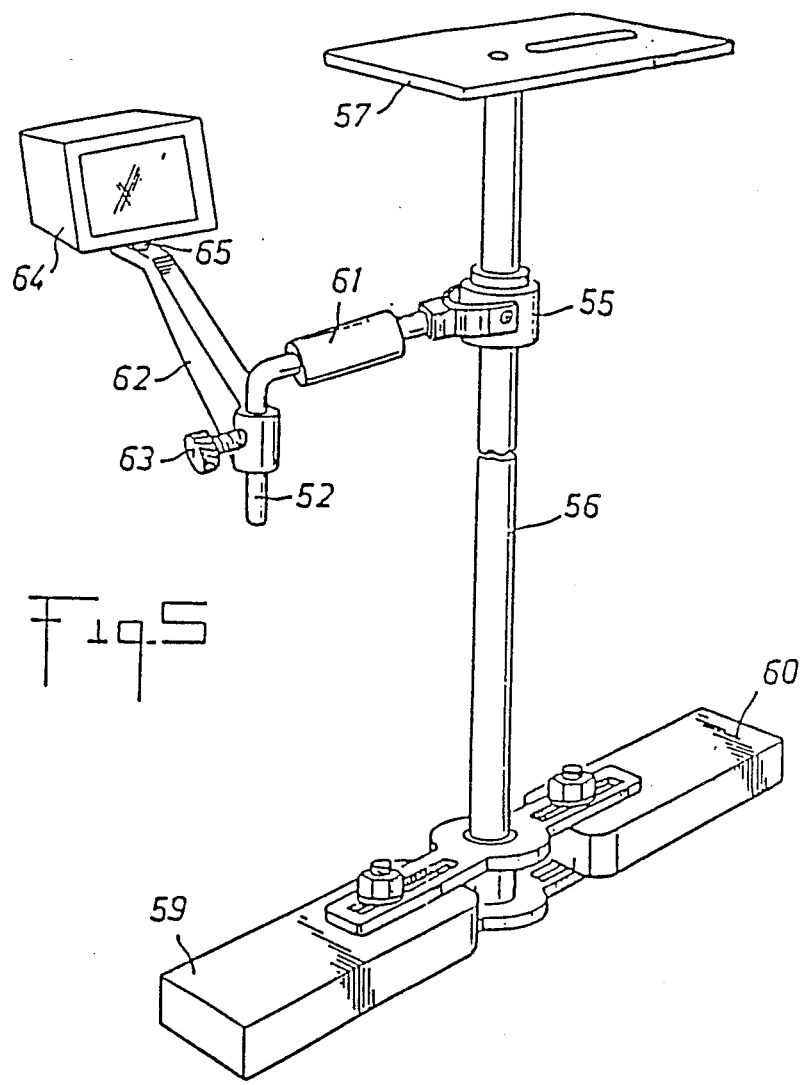
FIG. 5 shows the supporting arrangement for the camera.

As FIG. 5 shows, it is advantageous to provide a mounting for a video monitor 64 on the spindle 52 by means of a bracket 62 which can be immobilized by a screw 63, which mounting is articulated by means of a swivel spindle 65 which can be immobilized. The video monitor is thus independent of movements of the camera relative to the spindle 52. The cameraman can, for example, film in an azimuthal direction and at the same time take a panning shot in which the camera lens is guided without having to take his attention from the monitoring of the image even for a second during this procedure.

Figure 6:
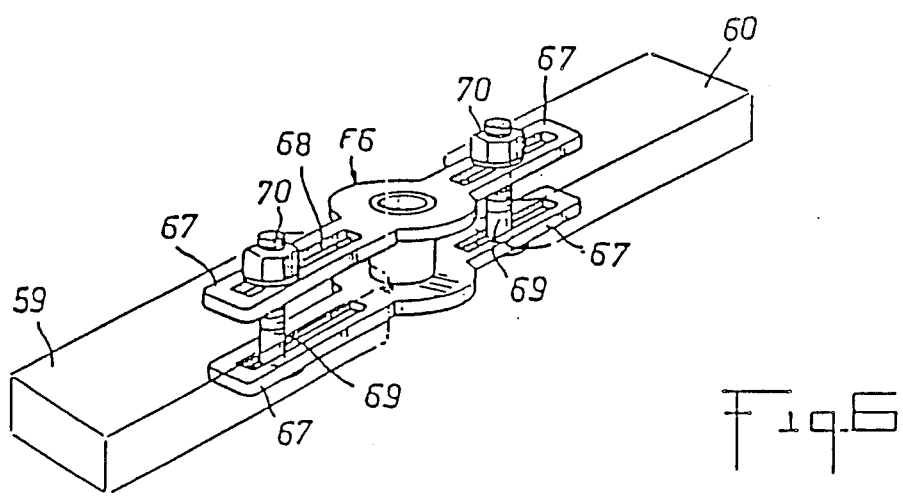
FIG. 6 shows an enlarged view of the adjustable arrangement for equilibrating the camera.

The weights 59, 60 used for equilibration are advantageously the battery 59 and the housing 60 accommodating the electronic circuit (or even the tape recorder). These parts are attached by means of a part 66 (FIG. 6) having a central sleeve which is supported on the tube 56 and is fixed via clamping teeth (not shown). At the ends of the sleeve are provided two flanges 67 which extend in opposite directions and are provided with slots 68. Two swivelling spindles 69 can be inserted between the lower and upper slots, and the underside of which swivelling spindles is provided a fixed stop which widens the spindle and on the upper threaded part 70 of which a nut can be screwed in order to rigidly clamp the spindle. Parts 59 and 60 are connected in articulated fashion to the swivelling spindles 69 and can be immobilized by tightening the nut 70.

By virtue of the slots 68, it is possible to distance parts 59 and 60 from the tube 56 and hence increase the component of inertia of these parts with respect to the tube. This entails a weakening of the troublesome rotary movements of the camera coaxially to the tube 56 and hence an increased stability. By virtue of the further possibility which is provided of arranging the parts 59, 60 by means of the spindles 69 not in the extension, as illustrated, but in any desired lateral alignment with respect to the tube 56, a centering error of the camera relative to the tube 56 can be compensated.

I claim:

1. A body-mounted support, in particular for cameras, having a support framework worn by a cameraman and mobile, equilibrated arms for holding the camera, said support comprising:
   (a) a frame including a rigid, essentially annular shell defined by two opposed half-shells, the half shells including a curved front lower half-shell adapted to engage a front part of the body of a cameraman and a curved rear upper half-shell adapted to engage a back part of the body of a cameraman, which half-shells are axially offset from each other so that they are situated at different levels of a cameraman's body and can be supported on a stomach region and a rear lumbar region, respectively, of a cameraman;
   (b) a pair of spaced, superposed half-frame members extending laterally outwardly in a forward direction from the angular shell, and including attachment means provided symmetrically on both sides of the shell for pivotally supporting the two half-frames relative to the shell, and connecting means carried by the half-frames for connecting the half-frames together so that they are at all times mutually parallel throughout their range of pivotal movement;
   (c) the connecting means including an articulated connecting part adjacent their forwardmost parts to which camera can be connected; and
   (d) the attachment means including counterbalance means provided between at least one of the half-frames and the shell in order substantially to counterbalance the weight of a camera.

2. A body-mounted support as claimed in claim 1, wherein the attachment means on each side of the support are spaced from each other and lie in a plane that is substantially parallel to a spinal column of a cameraman.

3. A body-mounted support as claimed in claim 1, wherein the support includes a curved hoop which is rigidly connected to and extends outwardly from the front half-shell, mounting means carried by the hoop on opposite sides thereof, and wherein the attachment means are aligned substantially perpendicularly to the mounting means.

4. A body-mounted support as claimed in claim 1, where each half-frame includes ends that engage in sliding and adjustable fashion in sleeves pivotally carried by the attachment means.

5. A body-mounted support as claimed in claim 1, wherein the counterbalance means includes at least one tension spring which stresses at least one half-frame upward and to the rear at an angle of about 45.

6. A body-mounted support as claimed in claim 1, including articulated connecting means carried by the half-frames and having a vertical supporting part which positioned in articulated and sliding relationship on the two half-frames, and blocking means by one half-frame for blocking sliding movement of the articulated connecting part.

7. A body-mounted support as claimed in claim 6, wherein the articulated connecting means includes a supporting part which is connected to and extends between each half-frame and articulated arm is arranged which is articulated by means of parallel articulation spindles and whose end has an arrangement means terminating in a mounting plate for the articulated mounting of a camera.

8. A body-mounted support as claimed in claim 7, including mounting means for mounting a video monitor on the articulated arm.

9. A body-mounted support as claimed in claim 7, wherein the articulated arm means includes a support tube, on one end of which the mounting plate for a camera is provided, and on the other end of which counterbalance means are provided whose position can be adjusted radially and angularly relative to the support tube.

* * * * *